(12) United States Patent
de Marchi (10) Patent No.: US 7,025,507 B2
(45) Date of Patent: Apr. 11, 2006

(54) PLUG-IN ELEMENT FOR AN OPTICAL PLUG-IN CONNECTION

(75) Inventor: Silverio de Marchi, Ascona (CH)

(73) Assignee: Diamond SA, Losone (CH)

( * ) Notice: Subject to any disclaimer, the term of this patent is extended or adjusted under 35 U.S.C. 154(b) by 0 days.

(21) Appl. No.: 10/503,811

(22) PCT Filed: Jan. 9, 2003

(86) PCT No.: PCT/EP03/00132

§ 371 (c)(1),
(2), (4) Date: Apr. 14, 2005

(87) PCT Pub. No.: WO03/067298

PCT Pub. Date: Aug. 14, 2003

(65) Prior Publication Data

US 2005/0180697 A1    Aug. 18, 2005

(30) Foreign Application Priority Data

Feb. 8, 2002  (EP) .................................. 02405090

(51) Int. Cl.
*G02B 6/36* (2006.01)
(52) U.S. Cl. ............................ 385/66; 385/58; 385/77; 385/78; 385/84
(58) Field of Classification Search .................. 385/58, 385/60, 66, 77, 78, 84
See application file for complete search history.

(56) References Cited

U.S. PATENT DOCUMENTS

| 5,179,608 | A | * | 1/1993 | Ziebol et al. .................. 385/81 |
| 5,214,732 | A | * | 5/1993 | Beard et al. .................. 385/78 |
| 5,732,175 | A | * | 3/1998 | Fan ............................. 385/87 |
| 6,325,547 | B1 | * | 12/2001 | Cammons et al. ............ 385/76 |

* cited by examiner

*Primary Examiner*—John D. Lee
*Assistant Examiner*—Rhonda S. Peace
(74) *Attorney, Agent, or Firm*—Nath & Associates PLLC; Gregory B. Kang; Teresa M. Arroyo (57) ABSTRACT

The invention relates to a plug-in element (1) for an optical plug-in connection. Said element comprises a connector pin (2), which is held in a guide sleeve (4) by axial spring-loaded prestress, in such a way that it can be displaced in a limited manner along its longitudinal axis (3). The guide sleeve consists of at least two casing elements (5, 5') that can be assembled along their longitudinal axes. Said casing elements significantly simplify the production and assembly, as no screw or adhesive connections are required.

15 Claims, 8 Drawing Sheets

PLUG-IN ELEMENT FOR AN OPTICAL PLUG-IN CONNECTION

The invention relates to a connector part for an optical plug-in connection according to the precharacterizing clause of claim 1. In the case of such connector parts, the axial spring prestress of the connector pin has the effect that the light transmission is ensured in the inserted state even when there are tolerance deviations or tensile forces on the cable. The guide sleeve in this case also serves for limiting the spring excursion and for the radial positioning of the connector pin.

Numerous solutions for the resilient mounting of the connector pin are already known. In most cases, the connector pin is thereby placed in a pin holder, which is then for its part held and guided in the guide sleeve. For example, CH-A-689 316 shows a pin holder which is formed in one piece with a cable receiving element by means of a connecting portion formed as a spring element. This is inserted into a guide sleeve, which forms the inner housing part of a push-pull connector.

According to EP-A-1,115,014, the pin holder is a separate part, which is mounted in a rotationally fixed and displaceable manner in the guide sleeve. The guide sleeve is closed, while enclosing a helical compression spring, by a housing terminal part, by which the entire unit can be inserted into an outer housing.

However, solutions in which the connector pin is mounted directly in a guide sleeve without a pin holder are also already known. For instance, EP-A-601 976 shows a guide sleeve which comprises two sleeve parts which can be screwed to each other. The two sleeve parts simultaneously hold a U-shaped fork, which engages in a recess on the connector pin and, as a result, limits the relative position and spring excursion of the latter.

The known solutions require to some extent complex assembly work and are not equally suited for all types of connector. It is therefore an object of the invention to provide a connector part of the type stated at the beginning which can be assembled quickly and easily and which has as few individual parts as possible.

The connector part is intended as far as possible to be able to be used for the construction of quite different optical connectors and, finally, it is intended that screwing or adhesive bonding operations are avoided during assembly.

This object is achieved according to the invention by a connector part which has the features in claim 1. The forming of the guide sleeve from at least two shell parts which can be fitted together along the longitudinal center axis simplifies assembly considerably and reduces the number of components that are necessary. The connector pin and the required compression spring can be enclosed directly between the shell parts, without complex screw connections being required. The guide sleeve in this case preferably comprises two identical shell parts, which can be fitted together on a plane running through the longitudinal center axis. As a result, the production costs can be reduced considerably, because a guide sleeve can be produced with a single type of shell in pairs.

The guide sleeve could, however, also be made up of more than two shell parts and these would not necessarily have to be identically formed. Furthermore, the shell parts would not necessarily have to butt against one another on a plane running through the longitudinal center axis. The plane of contact could also run in the form of a helical line.

Preferably, adjacent shell parts may have interengaging projections and recesses on their contact surfaces. In the case of identical shell parts, these projections and recesses are hermaphroditically formed, so that each shell part has both projections and recesses.

The projections and recesses may be configured in such a way that the shell parts are held together by a press fit or even by a snap connection. At least some of the projections and recesses may be studs and corresponding stud openings, which are formed conically in such a way that the shell parts are held together. The cone angle must in this case obviously be formed in such a way that self-locking occurs.

The shell parts may, however, also be loosely joined together. However, in particular for assembly purposes, it is advantageous in any event if the shell parts are releasably held together by at least one cuff surrounding them. Such a cuff may for example be slipped over the shell parts at an end portion.

A particularly advantageous mounting of the connector pin is obtained if a rib which engages in a recess in the outer casing of the connector pin in such a way that its spring excursion is limited and it is held in a rotationally fixed manner is arranged on the inner side of at least one shell part. In this way, no separate pin holder serving for guiding the connector pin is required. The relatively tricky adhesive bonding operation for the connector pin is consequently avoided. The connector pin consists of very hard material, such as ceramic material for example, at least on its outer casing. The recess can be provided directly during the production of the connector pin, so that subsequent machining is no longer required. A similar pin guidance has already been disclosed in connection with a conventional guide sleeve by EP-A-601,976, mentioned at the beginning.

It is particularly expedient for the angular positioning of the connector pin before the plugging-in operation if the connector pin or a component connected to the connector pin has at least one run-on flank, which is inclined in relation to a plane running through the longitudinal center axis and which can be pressed against a run-on edge or run-on surface on the inner side of at least one shell part, under the action of the spring force, to determine the rotational position of the connector pin. This ensures that the connector pin always assumes the same starting position before it is pressed back against the spring force.

The shell parts preferably also form on the inner side an abutment on which a helical compression spring acting directly or indirectly on the connector pin is supported. The abutment may in this case have the form of a peripheral collar. Instead of the helical compression spring, in certain cases other spring elements would also be conceivable.

The guide sleeve with its resiliently mounted connector pin already forms a functional end portion itself on an optical fiber cable for the transmission of light. Such an element can be installed in any desired optoelectronic systems. However, the guide sleeve is advantageously inserted in a rotationally fixed manner into a connector housing, a positioning portion being arranged on the outer side of the guide sleeve. The relative radial position between the guide sleeve and the connector housing is in this case fixed by a complementary positioning portion on the connector housing. The connector housing itself serves for protecting the connector pin and for tension-resistant locking in a socket part.

The positioning portion on the guide sleeve may have at least one positioning lug and the positioning portion on the connector housing may have a number of recesses evenly distributed around the circumference, into which the positioning lug can be inserted according to choice. This allows the guide sleeve for example to be used in six different relative radial positions in the connector housing, which are each spaced apart from the other by 60 angular degrees. The most favorable position for the light transmission can be determined by measuring methods known per se.

In certain cases, for example in the case of connector parts for polarized fibers, the selection between predetermined relative positions in the connector housing is not sufficient. In such cases, it is expedient if the guide sleeve can be inserted in a rotationally fixed manner into the connector housing in any desired relative radial position. In this way it is possible to determine the optimum transmission value precisely to within a fraction of angular degrees in advance on a manipulator before the final assembly takes place in the selected position.

To secure the guide sleeve in the connector housing, at least one resilient catch, which can engage behind a blocking shoulder in the connector housing, may be arranged on the guide sleeve. In this case, assembly obviously takes place without any tools. The catch is preferably formed in one piece with the guide sleeve, which further simplifies production. It is particularly advantageous in this case for the catch to be formed as a wall portion of a shell part protruding outward at an acute angle with respect to the longitudinal center axis.

Given an appropriate choice of the inside diameter on the shell parts between the end face of the connector pin and the blocking shoulder, the catch can be unlocked again with the aid of a tubular tool from the end face of the connector. However, unlocking from the outer side of the connector housing, for example via a suitable opening, would also be conceivable.

However, to secure the guide sleeve in the connector housing, it is also conceivable that there is arranged at least one resilient clamping disk, which can be clamped on a clamping portion in the connector housing. This variant has the advantage that the clamping portion can be formed in a hollow-cylindrical manner and that, by contrast with the resilient catches, no undercut or blocking shoulder is required. When the clamping disk is, pushed into the clamping portion, the clamping disk is bent back slightly, it being clamped in the clamping portion by its peripheral portion.

Particularly advantageously, the clamping disk is held in a clamping disk bearing between the shell parts, it having at least one clamping segment protruding through an opening in the guide sleeve. In this way, the clamping disk can be fixed without any problem with respect to its relative position in the axial direction. A particularly optimal effect can be achieved if the clamping disk has four clamping segments arranged in the manner of a cross. The clamping effect can also be improved if a number of clamping disks are arranged one behind the other with respect to the longitudinal center axis. Depending on the material and dimensioning of the components, the clamping force is set in such a way that the connector part can absorb a specific tensile force in the connector housing.

Finally, however, it is also possible that, to secure the guide sleeve in the connector housing, at least one conical portion which can be pressed into a corresponding cone receptacle in the connector housing is provided on the outer side of the guide sleeve. Depending on the cone angle, the elasticity of the material and the quality of the surface, a self-locking, frictional connection which can no longer be released under normal loading of the connector part can be achieved in this way. The conical clamping connection has the advantage that it can be produced very easily and that the components as a whole can be simplified. A cone taper of 1:30 has proven to be particularly advantageous for example. Furthermore, at least the conical portion on the guide sleeve is provided with a virtually mirror-smooth surface. In the case of the corresponding cone receptacle in the connector housing, it does not necessarily have to be a conical bore of the same length as the cone portion on the guide sleeve.

The shell parts are advantageously produced as injection-molded parts from plastic material. These can be produced at particularly low cost and with suitable precision. Under certain preconditions, however, ceramic or metallic materials would also be conceivable.

Exemplary embodiments of the invention are described in more detail below and are represented in the drawings, in which.

Figure 1:
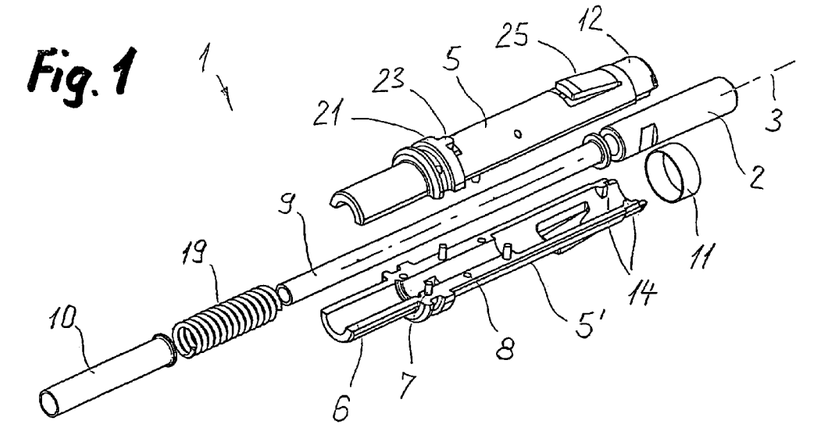
FIG. 1 shows a perspective representation of the individual parts of a first embodiment of a connector part.
Figures 4, 5:
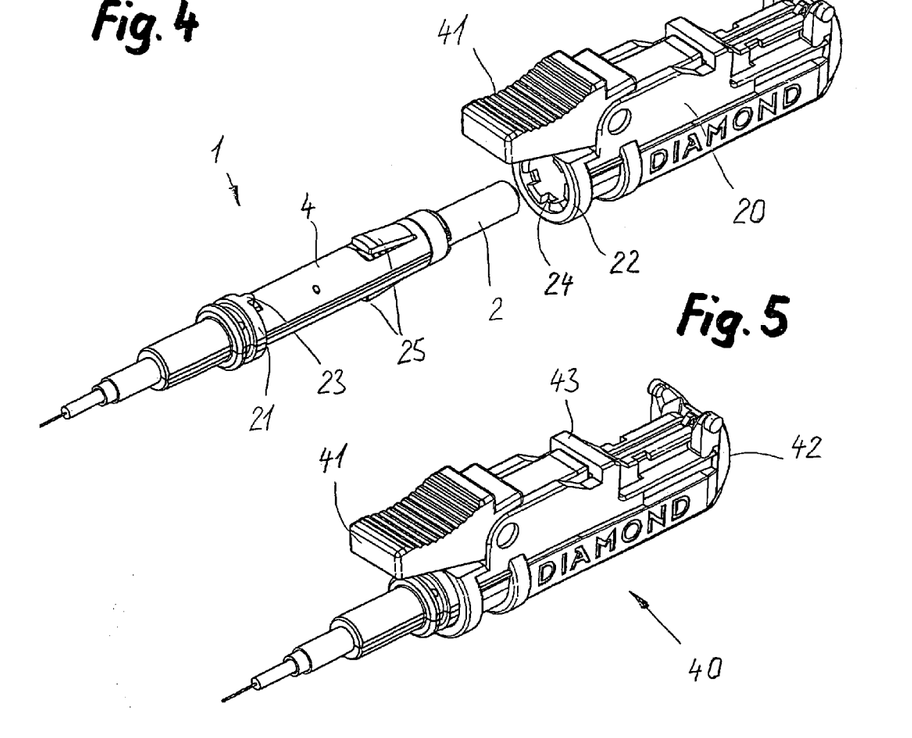
FIG. 4 shows the assembled connector part according to FIG. 1 before insertion into a connector housing.
FIG. 5 shows a ready-assembled optical connector according to a first embodiment.

As represented in FIG. 1, a connector part 1 comprises two identically formed shell parts 5, 5', which have studs 7 and stud openings 8 on their contact surfaces 6. Since the shell parts are hermaphroditically formed, two identical shell parts can be respectively joined together to form a guide sleeve 4 (FIG. 4).

A connector pin 2 and a helical compression spring 19 are held in this guide sleeve. A cable sleeve 9 and a cable end sleeve 10 ensure that the optical fiber cable (not represented here) runs in a protected manner in the center, or that any buckling forces are avoided. The two shell parts 5, 5' are secured by a cuff 11, which can be pushed onto a cuff bearing 12.

Figure 2:
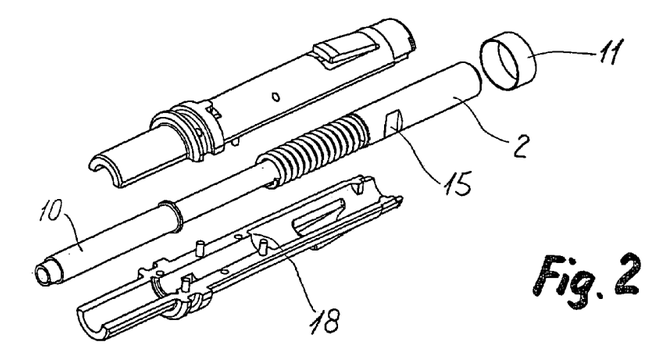
FIG. 2 shows the individual parts according to FIG. 1 after a first assembly step.

Diametrically opposed tangential ribs 14 are arranged on the inner side of each shell part. These ribs engage in corresponding recesses 15 on the connector pin 2, the width of the recesses being greater than the width of the ribs, so that the connector pin can cover a specific spring excursion in the direction of the longitudinal center axis 3. The connector pin 2 is pressed by means of the helical compression spring 19 in the recesses 15 against the ribs 14, the helical compression spring being supported on an abutment 18 (FIG. 2).

Figure 3:
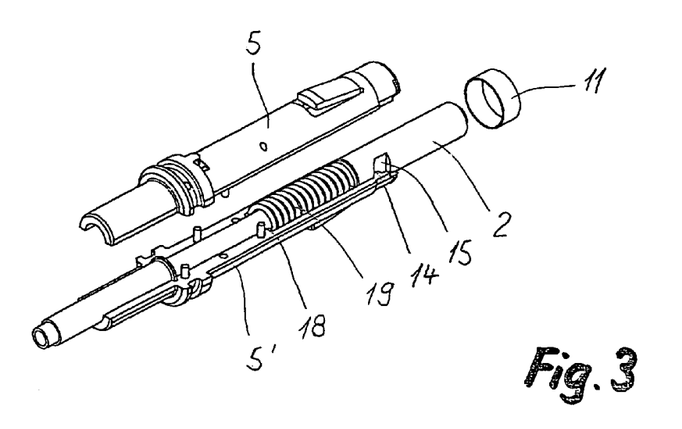
FIG. 3 shows the individual parts according to FIG. 1 after a second assembly step.

FIG. 3 shows the inserted connector pin with the helical compression spring on the shell part 5' before the guide sleeve is closed with the shell part 5.

FIG. 4 shows the ready-assembled connector part 1 before insertion into a connector housing 20. For the anchorage in the connector housing, a catch 25 is provided on the guide sleeve 4 or on each shell part, is connected in one piece to each shell part and can be pressed resiliently inward. The radial angular position of the connector part 1 in the connector housing 20 is fixed by a positioning portion 21 on the guide sleeve 4, which portion interacts with a corresponding positioning portion 22 on the connector housing 20. Arranged for this purpose on the positioning portion 21 are two diametrically opposed positioning lugs 23, which can engage in evenly distributed recesses 24 on the positioning portion 22. Before assembly, the optimum relative position is in this case determined on the connector part 1 by measuring the light emerging at the end face of the connector pin, and the connector part is subsequently inserted in the next-possible relative position.

Figure 6:
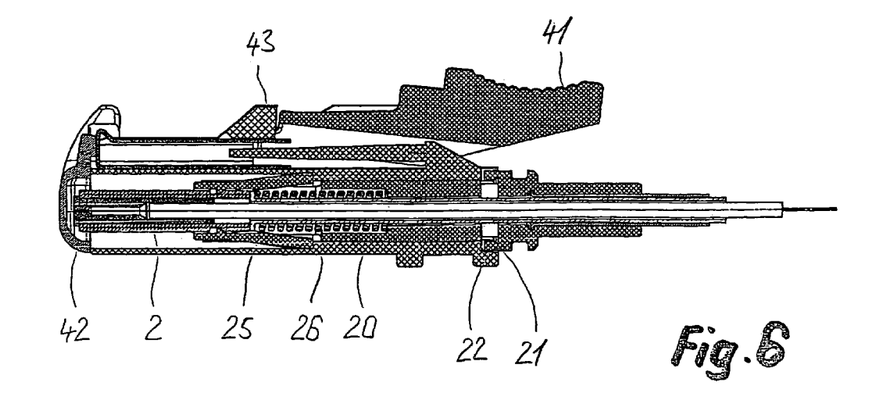
FIG. 6 shows a longitudinal section through the optical connector according to FIG. 5.

The interengagement of the positioning portions 21 and 22 can be seen in FIG. 6. How the two catches 25 engage behind corresponding blocking shoulders 26 is also represented. It goes without saying that the positioning portions 21, 22 could also be omitted, so that the connector part 1 can be inserted in any desired angular position. In such a case, the rotational securement would have to take place by adhesive bonding or in some other way.

Finally, other elements of the optical connector, designated as a whole by 40, can also be seen from FIGS. 5 and 6. In the present case, a protective flap 42, which opens of its own accord when the connector is inserted into a socket, is arranged on the end face of the housing. A locking strip 43, on which a corresponding catch can engage, serves for the locking in the socket. An unlocking lever 41 is provided for releasing the locking.

Figure 7:
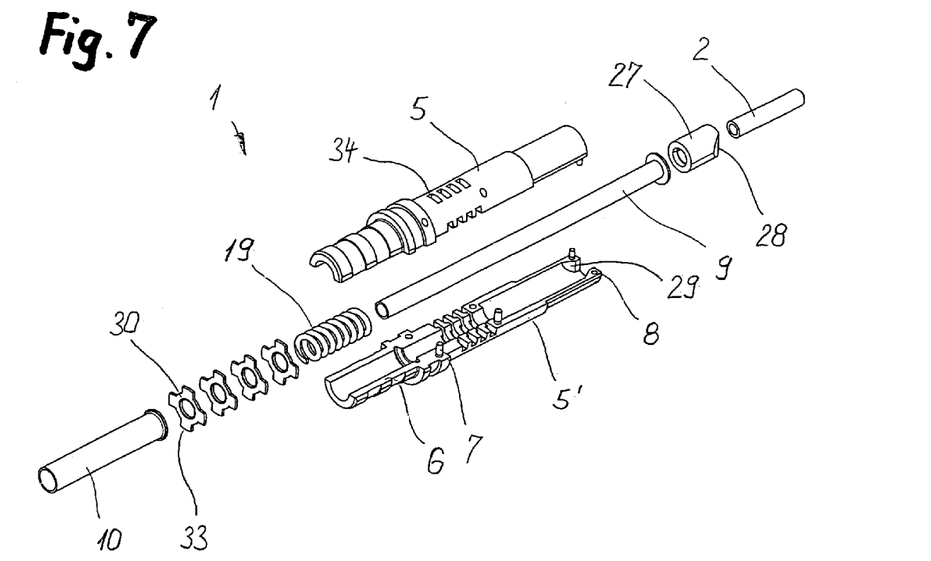
FIG. 7 shows a perspective representation of the individual parts of a second embodiment of a connector part.

FIG. 7 shows the individual parts of an alternative embodiment of a connector part 1, which is constructed similarly to that according to FIG. 1 in respect of the basic principle. The mounting of the connector pin in the guide sleeve and the securement of the latter in the connector housing are differently achieved, however. Accordingly, the guide sleeve 4 (FIG. 9) in turn comprises the two shell parts 5 and 5', which can be joined together, fitting exactly, at the contact surfaces 6 by means of studs 7 and stud openings 8. However, in the present case, the studs and stud openings are conically formed in a self-locking manner, so that the shell parts hold themselves together. It is therefore possible to dispense with a cuff, as provided in the case of the exemplary embodiment according to FIG. 1.

The connector pin 2 is not guided directly, but on a pin holder 27 between the two shell parts. The connector pin may in this case be adhesively embedded in the pin holder. Toward the end face of the connector, the pin holder has two mutually opposite run-on flanks 28, which correspond to run-on surfaces 29 on the inner side of the shell parts.

Here, too, an abutment 18 is provided, in the form of a peripheral shoulder, for the helical compression spring 19 and the optical fiber cable is guided through a cable sleeve 9, which can be displaced together with the connector pin 2.

On the other hand, the cable end sleeve 10 pushed over the cable sleeve 9 is firmly embedded between the two shell parts 5, 5'.

Figure 8:
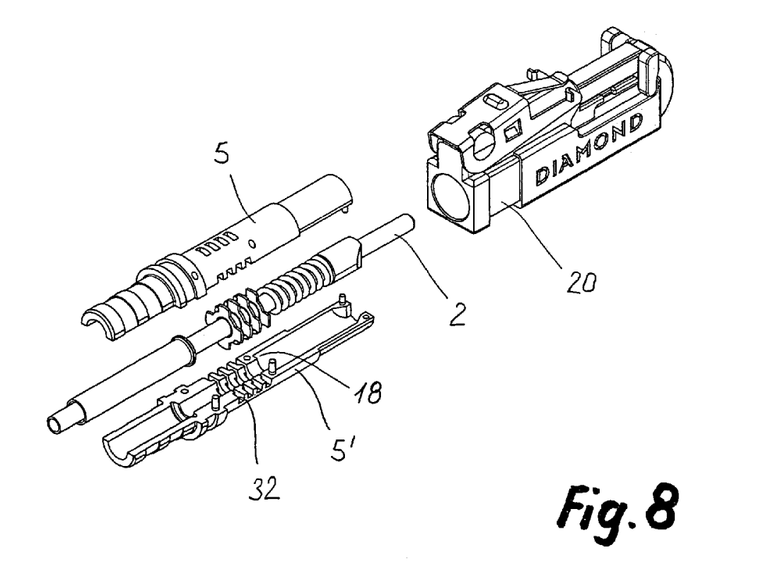
FIG. 8 shows the individual parts according to FIG. 7 after a first assembly step.
Figure 9:
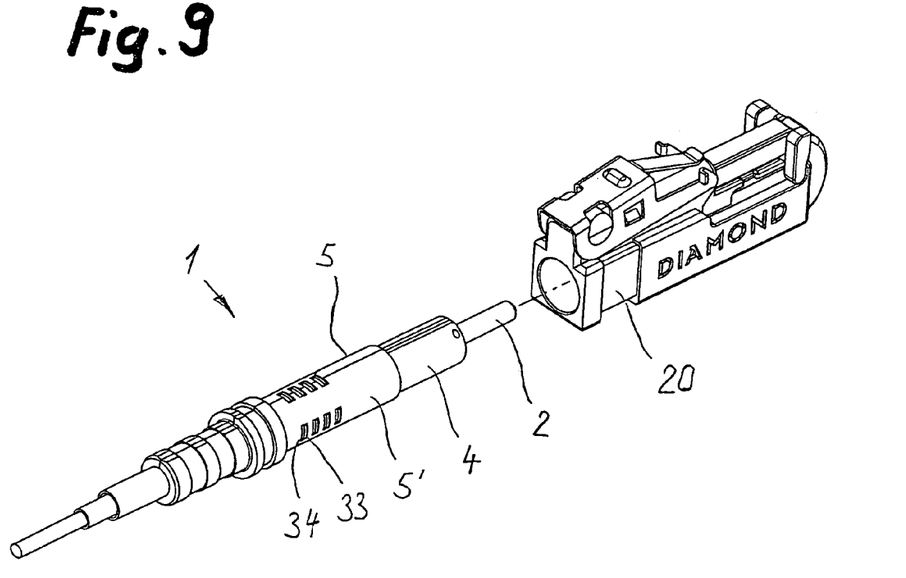
FIG. 9 shows the ready-assembled connector part according to FIG. 7 before insertion into a connector housing.

To secure the connector part 1 in the connector housing 20 (FIG. 8), a total of four clamping disks 30 are clamped-in between the two shell parts, to be precise in clamping disk bearings 32 provided especially for them. Each clamping disk of steel, or possibly also of plastic material, has clamping segments 33 which are arranged in the manner of a cross and protrude through corresponding openings 34 in the half-shells. The ready-assembled connector part 1 of this embodiment is represented in FIG. 9 before insertion into a connector housing 20.

Figure 10:
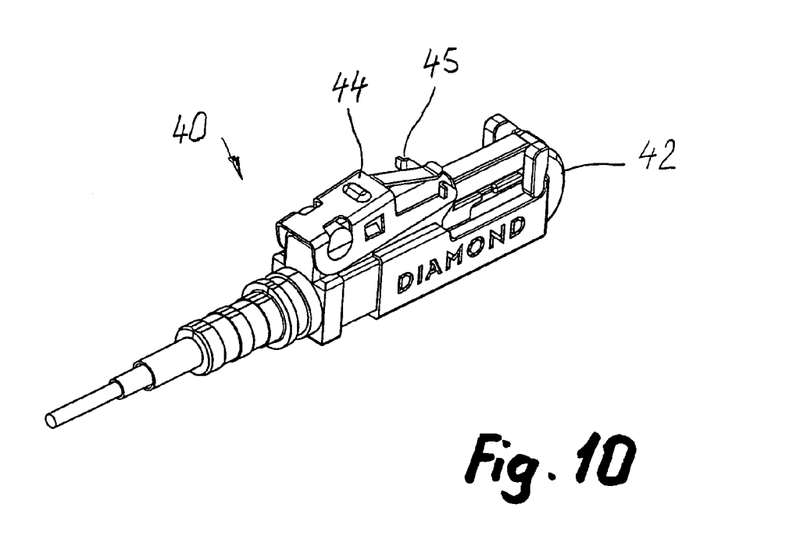
FIG. 10 shows a second embodiment of a ready-assembled optical connector.

The optical-connector 40 according to FIG. 10 has a somewhat different outer configuration than that according to FIG. 5. The protective flap 42, which can be swung up, is the same. On the other hand, the anchorage in a socket part takes place with the aid of a locking lever 44, which is snap-fitted onto the connector housing and the catches 45 of which can engage in the socket part. For the unplugging operation the locking lever 44 must be pressed down.

Figure 11:
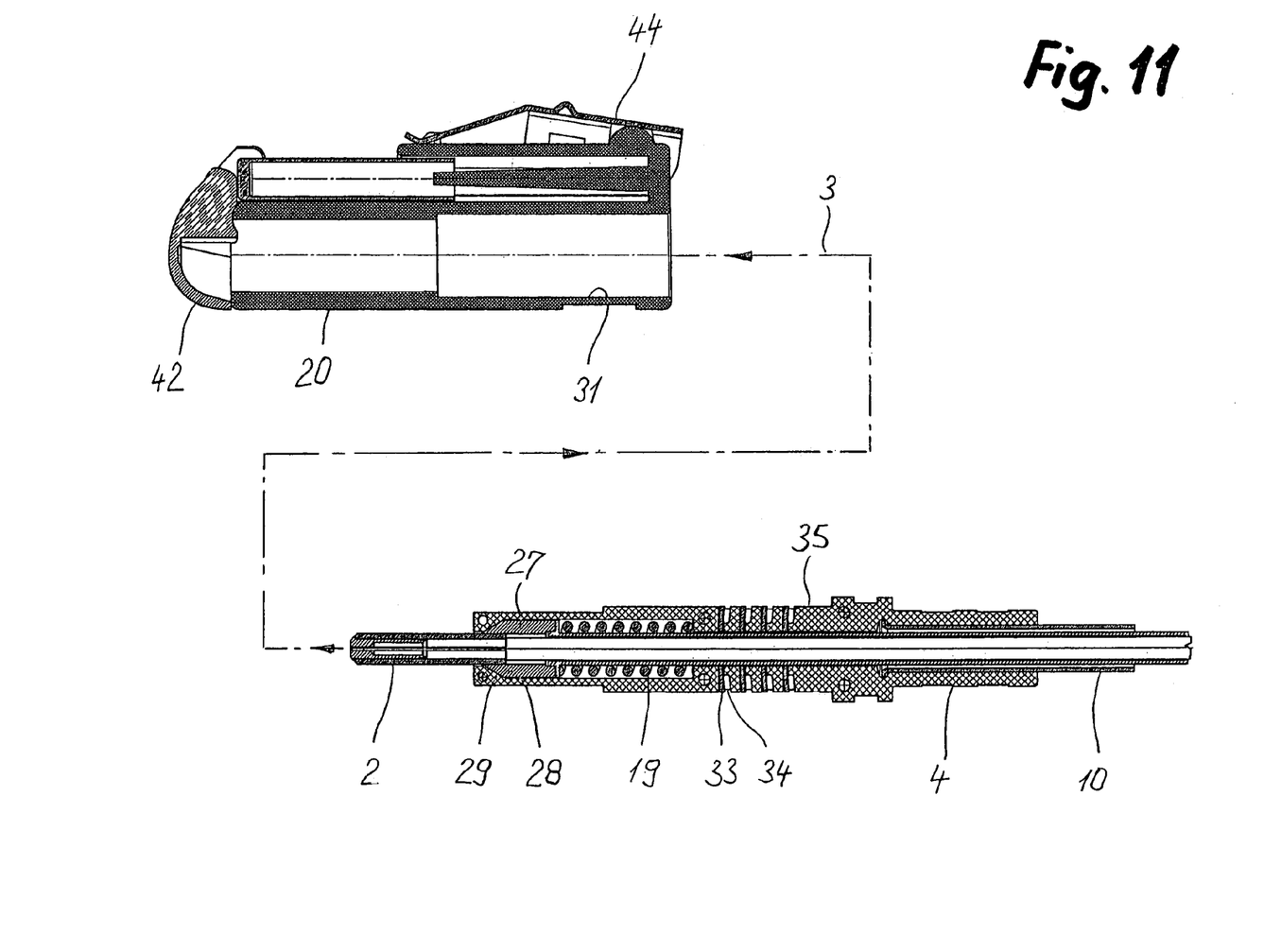
FIG. 11 shows a cross section through the connector housing and through the connector part according to FIG. 9.
Figure 12:
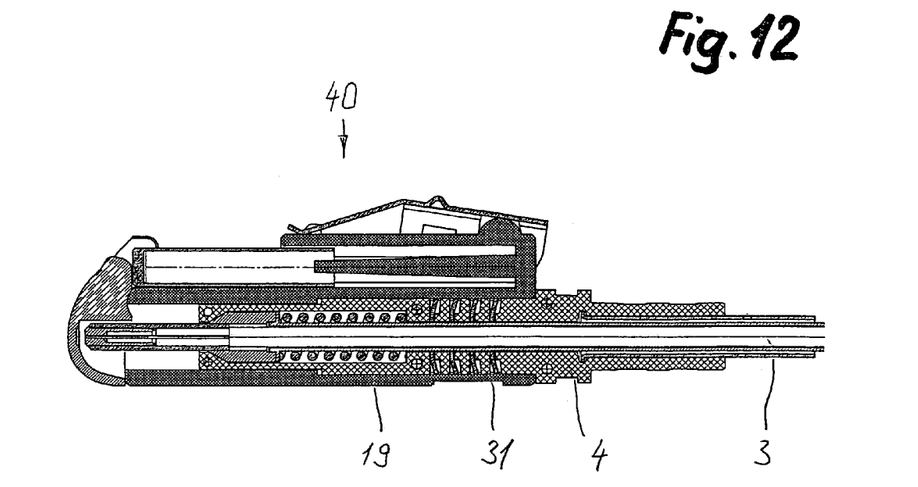
FIG. 12 shows a cross section through the optical connector according to FIG. 10.
Figure 13:
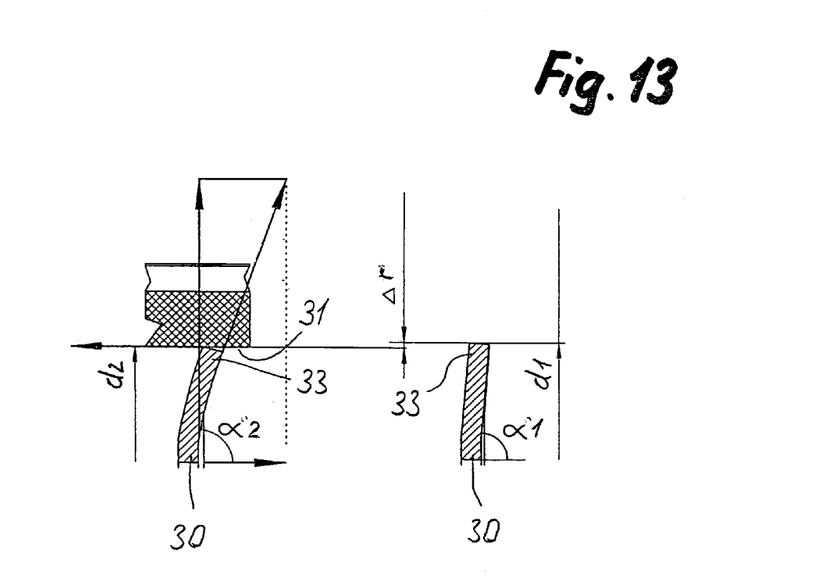
FIG. 13 shows a representation of a detail of a clamping disk in the optical connector according to FIG. 12.

The mounting of the connector pin and the rotationally fixed fixing of the connector part in the connector housing is presented in somewhat greater detail on the basis of FIGS. 11 to 13.

It is evident from FIG. 11 that the connector housing 20 has a hollow-cylindrical clamping portion 31 in cross section. The clamping disks 33 are firmly clamped-in and run transversely in relation to the longitudinal center axis 3. The clamping segments protrude out slightly through the openings 34 beyond the outer casing 35 of the guide sleeve 4. The openings 34 on the other hand are slightly wider than the clamping segments 33, so that the latter can bend back slightly. The blocking effect of the clamping disks is represented in FIGS. 12 and 13. In the relaxed state outside the connector housing 20, the clamping disks 30 have an outside diameter d1 and the clamping segments 33 are slightly beveled at an angle α1. The outside diameter d1 is slightly greater than the inside diameter d2 at the clamping portion 31, so that the difference in radius Δr is obtained. When the connector part is pushed into the connector housing, this leads to the bending back of the clamping segments 33 against their own spring prestress, so that they assume the angle α2. As can be seen, each clamping disk 30 is clamped in the clamping portion 31, the prevailing clamping forces being produced from the necessary pressing-in force by the parallelogram of forces.

It is also evident from FIGS. 11 and 12 how the pin holder 27 or its run-on flanks 28 are pressed against the corresponding run-on surfaces 29. In this way, the connector pin 2 is always positioned in the correct relative position.

The anchorage of the connector part 1 by means of clamping disks 30 is suitable particularly well for polarized optical waveguides, the relative radial position of which has to be fixed very exactly. As is evident from FIG. 11, no interacting positioning portions are provided on the connector housing 20 or on the connector part 1, because the clamping disks. 30 in any event ensure a rotationally fixed connection.

The fixing of a connector part in a connector housing with the aid of the clamping disks described could also be used under some circumstances on conventional connector parts which are not made up of shell parts. The individual clamping disks could in this case also be fixed on the outer casing of the connector part or they could even be formed in one piece with the latter.

Figure 14:
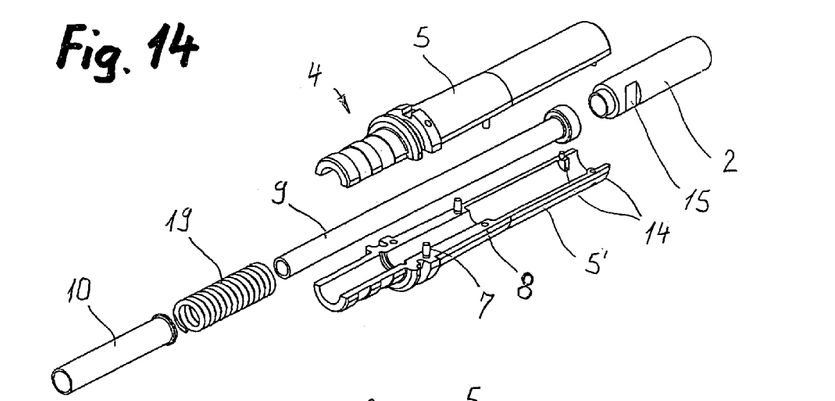
FIG. 14 shows a perspective representation of the individual parts of a third embodiment of a connector part.
Figure 15:
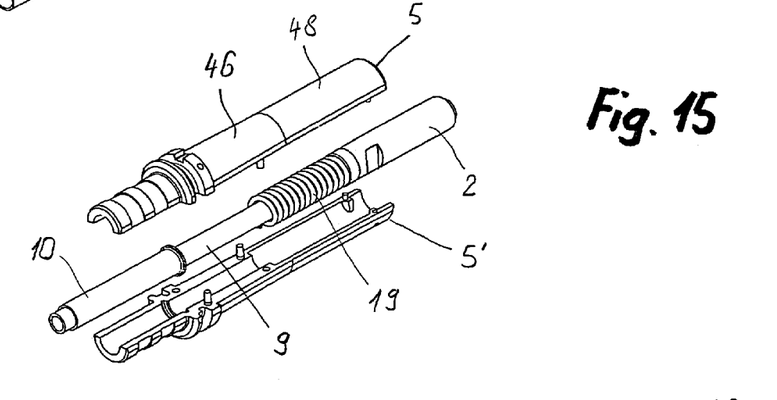
FIG. 15 shows the individual parts according to FIG. 14 after a first assembly step.

FIG. 14 shows the individual parts of a further alternative embodiment of a connector part 1, which is likewise constructed in a way similar to that according to FIG. 1 or 7. The mounting of the connector pin 2 in the guide sleeve 4 is achieved in the same way as in the case of the exemplary embodiment according to FIG. 1, that is to say by means of adjacent ribs 14 which engage in corresponding recesses 15 on the connector pin 2. On the other hand, no special components at all are provided for the fixing of the guide sleeve in a connector housing. The only measure is that a conical portion 46 is provided on the outer side of the guide sleeve and merges with a cylindrical portion 48 (FIG. 15).

Figure 16:
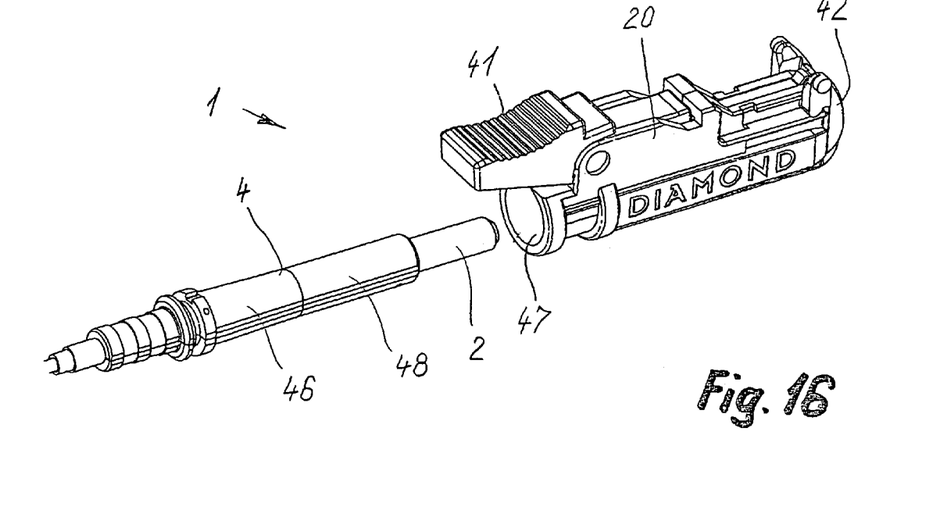
FIG. 16 shows the ready-assembled connector part according to FIG. 14 before insertion into a connector housing.

Provided on the inner side of the connector housing is a cone receptacle 47, as can be seen from FIG. 16. After the correct radial positioning of the guide sleeve 4, the latter is pressed into the connector housing 20, whereby an intensive clamping connection is established. A positioning portion for the radial positioning, which interacts with a complementary portion on the connector housing, may in this case be provided on the guide sleeve. Alternatively, however, it is possible, as in the case of the exemplary embodiment according to FIGS. 7 to 13, to select any desired radial position.

Figure 17:
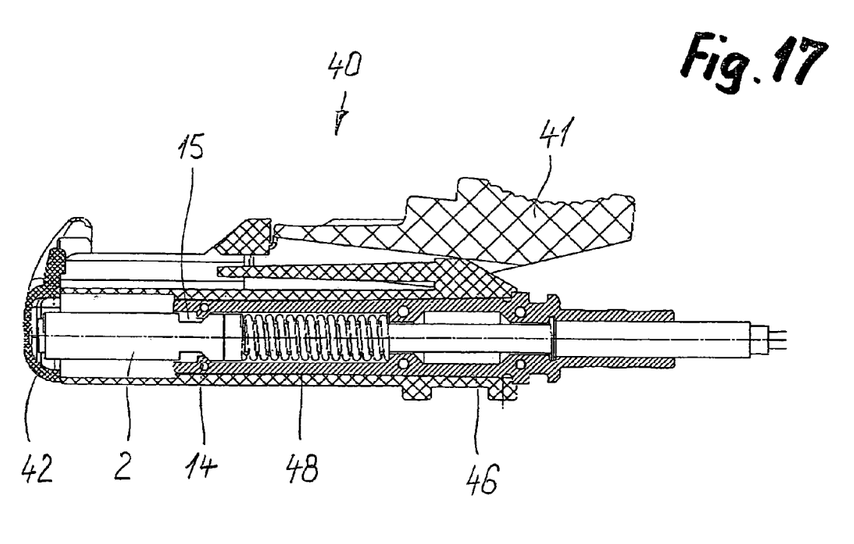
FIG. 17 shows a longitudinal section through the ready-assembled connector according to FIG. 16.

FIG. 17 shows the guide sleeve pressed into the connector housing. Likewise clearly visible here is the mounting of the connector pin 2, axially displaceable in relation to the two half-shells of the guide sleeve. Said connector pin can be pushed back against the force of the helical compression spring 19, until the ribs 14 hit the opposite wall of the recess 15.

What is claimed is:

1. A connector part (1) for an optical plug-in connection, with a connector housing (20) and at least one cylindrical connector pin (2), which is held in a guide sleeve (4) under axial spring prestress in such a way that it can be displaced in a limited manner in its longitudinal center axis (3), characterized in that:
the guide sleeve (4) comprises at least two shell parts (5, 5'), which can be fitted together along the longitudinal center axis (3), the guide sleeve (4) is inserted in a rotationally fixed manner into the connector housing (20), in that a positioning portion (21) is arranged on an outer side of the guide sleeve (4) and in that the relative radial position between the guide sleeve (4) and the connector housing (20) is fixed by a complementary positioning portion (22) on the connector housing (20) and to secure the guide sleeve (4) in the connector housing (20), and at least one conical portion (46) which can be pressed into a corresponding cone receptacle (47) in the connector housing (20) is provided on the outer side of the guide sleeve (4).

2. A connector part (1) for an optical plug-in connection, with a connector housing (20) and at least one cylindrical connector pin (2), which is held in a guide sleeve (4) under axial spring prestress in such a way that it can be displaced in a limited manner in its longitudinal center axis (3), characterized in that:
the guide sleeve (4) comprises two identical shell parts (5, 5'), which can be fitted together on a plane running through the longitudinal center axis (3), the guide sleeve (4) is inserted in a rotationally fixed manner into the connector housing (20), in any desired radial position, whereas to secure the guide sleeve (4) in the connector housing (20), and at least one conical portion (46) which can be pressed into a corresponding cone receptacle (47) in the connector housing (20) is provided on the outer side of the guide sleeve (4).

3. A connector part (1) for an optical plug-in connection, with a connector housing (20) and at least one cylindrical connector pin (2), which is held in a guide sleeve (4) under axial spring prestress in such a way that it can be displaced in a limited manner in its longitudinal center axis (3), characterized in that:
the guide sleeve (4) comprises at least two shell parts (5, 5'), which can be fitted together along the longitudinal center axis (3); and
adjacent shell parts have interengaging projections (7, 9) and recesses (8, 10) on their contact surfaces (6, 6'), at least some of the projections (7, 9) and recesses (8, 10) are studs and corresponding stud openings, which are formed conically in such away that the shell parts (5, 5') are held together.

4. The connector part as claimed in claim 1, characterized in that the shell parts (5) are releasably held together by at least one cuff (11) surrounding them.

5. The connector part as claimed in claim 1, characterized in that a rib (14) is arranged on the inner side of at least one shell part said rib engages in a recess (15) in the outer casing of the connector pin (2) in such a way that its spring excursion is limited and it is held in a rotationally fixed manner.

6. A connector part (1) for an optical plug-in connection, with a connector housing (20) and at least one cylindrical connector pin (2), which is held in a guide sleeve (4) under axial spring prestress in such a way that it can be displaced in a limited manner in its longitudinal center axis (3), characterized in that:
the guide sleeve (4) comprises at least two shell parts (5, 5'), which can be fitted together along the longitudinal center axis (3); and
the connector pin (2) or a component connected to the connector pin (2) has at least one run-on flank, which is inclined in relation to a plane running through the longitudinal center axis and which can be pressed against a run-on edge or run-on surface on the inner side of at least one shell part (5), under the action of the spring force, to determine the rotational position of the connector pin (2).

7. The connector part as claimed in claim 1, characterized in that the shell parts (5, 5') form on the inner side an abutment (18) on which a helical compression spring (19) acting directly or indirectly on the connector pin (2) is supported.

8. The connector part as claimed in claim 1, characterized in that, to secure the guide sleeve (4) in the connector housing (20), there is arranged at least one resilient catch (25), which can engage behind a blocking shoulder (26) in the connector housing.

9. The connector part as claimed in claim 8, characterized in that the catch (25) is formed as a wall portion of a shell part (5) protruding outward at an acute angle with respect to the longitudinal center axis (3).

10. The connector part as claimed in claim 1, characterized in that, to secure the guide sleeve (4) in the connector housing (20), there is arranged at least one resilient clamping disk (30), which can be clamped on a clamping portion (31) in the connector housing.

11. The connector part as claimed in claim 10, characterized in that the clamping disk is held in a clamping disk bearing (32) between the shell parts, and in that it has at least one clamping segment (33) protruding through an opening (34) in the guide sleeve.

12. The connector part as claimed in claim 11, characterized in that the clamping disk has four clamping segments arranged in the manner of a cross.

13. The connector part as claimed in claim 10, characterized in that a number of clamping disks are arranged one behind the other with respect to the longitudinal center axis.

14. The connector part as claimed in claim 2, characterized in that, to secure the guide sleeve (4) in the connector housing (20), there is arranged at least one resilient catch (25), which can engage behind a blocking shoulder (26) in the connector housing.

15. The connector part as claimed in claim 2, characterized in that, to secure the guide sleeve (4) in the connector housing (20), there is arranged at least one resilient clamping disk (30), which can be clamped on a clamping portion (31) in the connector housing.

\* \* \* \* \*